United States Patent [19]
Sasaoka

[11] Patent Number: 5,504,856
[45] Date of Patent: Apr. 2, 1996

[54] METHOD AND APPARATUS FOR CONTROLLING SWITCHING OF TRANSMISSION LINE

[75] Inventor: Yoshiharu Sasaoka, Fujisawa, Japan

[73] Assignee: Hitachi, Ltd., Tokyo, Japan

[21] Appl. No.: 921,769

[22] Filed: Jul. 30, 1992

[30] Foreign Application Priority Data

Jul. 30, 1991 [JP] Japan .................................. 3-189995

[51] Int. Cl.⁶ .................................................. G06F 11/00
[52] U.S. Cl. ..................... 395/182.01; 371/68.2; 371/20.1
[58] Field of Search ........................... 371/8.2, 8.1, 11.2, 371/68.1, 68.2; 395/182.01

[56] References Cited

U.S. PATENT DOCUMENTS

| | | | |
|---|---|---|---|
| 4,680,776 | 7/1987 | Ikeuchi | 375/40 |
| 4,894,827 | 1/1990 | Ramsay | 371/8.2 |
| 4,989,130 | 1/1991 | Moriyama | 371/8.1 X |
| 5,010,550 | 4/1991 | Hirata | 371/8.2 |
| 5,056,090 | 10/1991 | Kubota | 371/8.2 |
| 5,097,467 | 3/1992 | Taniguchi | 371/8.2 |
| 5,153,874 | 10/1992 | Kohno | 371/8.2 X |
| 5,166,933 | 11/1992 | Nambu | 371/11.2 X |
| 5,278,977 | 1/1994 | Spencer | 371/8.2 X |

FOREIGN PATENT DOCUMENTS 60-180340  9/1985  Japan .

*Primary Examiner*—Robert W. Beausoliel, Jr.
*Assistant Examiner*—Glenn Snyder
*Attorney, Agent, or Firm*—Antonelli, Terry, Stout & Kraus

[57] ABSTRACT

In transmission lines with a redundant structure having a switching control communication channel, the fault status of a transmission line, communication channel data, and transmission line selection status are inputted into a memory as addresses, and the transmission line is switched and the switching control data is transmitted using the output data. By doing this, when a fault occurs and the current transmission line is switched to a spare transmission line, the switching is performed in a short time without the processing load of the CPU being increased.

12 Claims, 3 Drawing Sheets

FIG. 3

| K1 BYTE | | | | | | | | K2 BYTE | | | | | | | |
|---|---|---|---|---|---|---|---|---|---|---|---|---|---|---|---|
| b1 | b2 | b3 | b4 | b5 | b6 | b7 | b8 | b1 | b2 | b3 | b4 | b5 | b6 | b7 | b8 |
| SWITCHING REQUEST TYPE | | | | CURRENT TRANSMISSION LINE NUMBER OUTPUTTING SWITCHING REQUEST | | | | CURRENT TRANSMISSION LINE NUMBER CONNECTED TO SPARE TRANSMISSION LINE | | | | | TRANSMISSION LINE STATUS | | |

SWITCHING SYSTEM CONFIGURATION SETTING

METHOD AND APPARATUS FOR CONTROLLING SWITCHING OF TRANSMISSION LINE

BACKGROUND OF THE INVENTION

The present invention relates to a transmission line switching control method and apparatus comprising a plurality of transmission lines, for example, a current transmission line and a spare transmission line for automatically switching the current transmission line to the spare transmission line when a fault occurs in the current transmission line. More specifically, the invention relates to a transmission line switching control method and apparatus for controlling switching of the transmission line when a fault occurs in the transmission line by receiving fault information indicating the fault and switching control data sent by a switching communication channel. The conventional transmission line has a redundant structure, for example, so as to prevent line disconnection due to an occurrence of a fault in the transmitter. The redundant structure is a transmission line structure that a spare transmission line is prepared besides the current transmission line which is now in use. For switching the transmission line having such a redundant structure, a switching control channel is mounted in the transmission line, and both stations (the self transmitter and an opposite transmitter opposite to the above transmitter) communicate the fault status mutually (transmit or receive data), and the transmission line is switched by the above communication. As an example thereof, a transmission system switching control unit is disclosed in Japanese Patent Laid-Open No. 60-180340. The transmission system switching control unit comprises a transmitter status reading circuit, a switching unit status reading circuit, a load status reading circuit, a storage circuit, a central processing unit (CPU), a transmitter control circuit, and a switching unit control circuit, and when a fault occurs in the transmitter, decides whether the fault occurs in the transmitter now in use or in the spare transmitter or the status which is read by each circuit by the central processing unit, and switches the current transmitter to the spare transmitter when the fault occurs in the current transmitter.

However, according to such a transmission system switching control unit, fault occurrence information and information read by each circuit are all read and processed by the central processing unit, in other words, there are many conditions to be decided such as receiving switching control data by the processing unit, etc. Therefore, it requires a lot of time so as to complete the execution of switching. Particularly when a plurality of transmission lines are processed, each transmission line is processed by the central processing unit (CPU) on a time series basis. Therefore, the operation time required for switching control by the CPU and the time required from an occurrence of a fault to completion of switching increase in proportion to the number of transmission lines. Furthermore, as the number of transmission lines to be installed increases, the operation time of the control CPU of the equipment required for switching control increases and it causes difficulties to another control. In proportion to an increase in the operation time of the control CPU of the equipment, the time required for recovery of the fault status of the transmission line also increases.

SUMMARY OF THE INVENTION

The object of the present invention is to provide a transmission line switching control method and apparatus for reducing the load of the control CPU of the equipment and furthermore shortening the switching process time so as to reduce the transmission line switching time.

To accomplish the above object, according to the present invention, the fault status, transmission line selection status, receiving switching control data from an opposite transmitter of the self transmitter, and timer status used for control are sent to the memory as addresses, and the switching control is executed using the output data thereof, and the switching control data is sent to the opposite transmitter.

Furthermore, according to the present invention, the timer value necessary for the above switching procedure can be changed externally, and switching of only a specific transmission line or of all the transmission lines can be stopped by external setting, and furthermore the number of processing transmission lines can be changed by external setting.

According to the present invention, it is possible to determine switching control data, for example, the current or spare transmission line selection status and send the switching information to the opposite transmitter without using the control CPU of the equipment, and to switch the self transmitter by sending the switching information to the control CPU of the self transmitter, and to reduce the load of the control CPU of the self transmitter and shorten the transmission line switching process time.

Furthermore, the timer value, switching inhibition, or the number of processing transmission lines can be set externally and various switching methods can be used.

BRIEF DESCRIPTION OF THE DRAWINGS

FIG. 3 is a drawing showing M section overhead information (K1 and K2 bytes) of the synchronous digital hierarchy (SDH) transmission line interface used for description of the present invention.

DETAILED DESCRIPTION OF THE PREFERRED EMBODIMENTS

Figure 1:
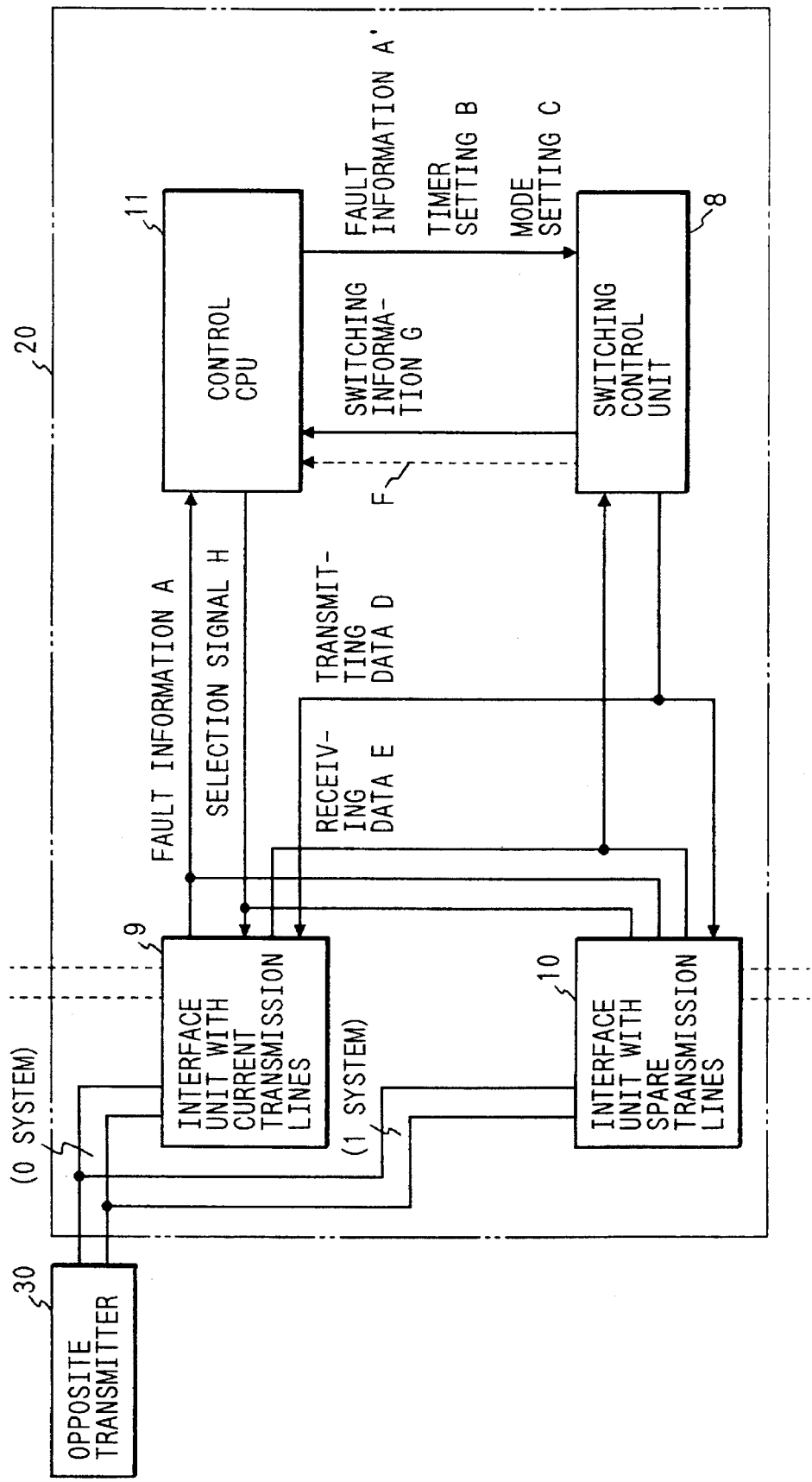
FIG. 1 is a schematic view of the basic system of a transmitter indicating an embodiment of the transmission line switching control method and apparatus thereof of the present invention.

The present invention will be described hereunder on the basis of the embodiments. FIG. 1 is a schematic view of the basic system of a transmitter indicating an embodiment of the transmission line switching control method and apparatus thereof of the present invention.

In FIG. 1, numeral 20 indicates a self transmitter, which contains an interface unit 9 with a plurality of current transmission lines having a switching control channel, an interface unit 10 with a plurality of spare transmission lines having a switching control channel in the same way, a control central processing unit (CPU) 11 of the self transmitter connected to the above two interface units, and a switching control unit 8 connected to the above two interface units 9 and 10 and to the central processing unit (CPU) 11.

Next, the switching procedure for the transmitter of the switching system of this configuration will be described. Firstly, assuming that, for example, a fault is detected in the current transmission line interface unit 9 of the self transmitter, the above fault information A is sent to CPU 11. In the transmission line of a synchronous digital hierarchy (SDH) network which was defined, for example, as a new synchronous interface in the International Telegraph and Telephone Consultative Committee in November 1988, the K1 or K2 byte which is M section 0H (overhead) information of the SDH transmission line interface used as communication control information with opposite transmitter 30 as shown in FIG. 3 and switching is executed on the basis of the fault. In FIG. 3, the K1 byte is composed of the switching request type comprising b1 to b4 and the current transmission line number comprising b5 to b8 which outputs the switching request, and the K2 byte is composed of the current transmission line number comprising b1 to b4 which is connected to the spare transmission line, the switching system configuration setting comprising b5, and the transmission line status comprising b6 to b8. The switching request type is, for example, as shown in the table below.

TABLE

| | | | Switching Request Type | | | | |
|---|---|---|---|---|---|---|---|
| Item No. | Switching Request Type | Description | K1 byte b1, b2, b3, b4 | | | | |
| 1 | Forced Switch (FS) | The switching is performed when the spare transmission line status is normal. | 1 | 1 | 1 | 0 |
| 2 | Signal Fail (SF) | The switching is performed when the spare transmission line status is normal assuming dis-connection of the current transmission line input signal, failure in frame synchronization, or an error of the section AIS or equipment monitor result as a trigger. | 1 | 1 | 0 | 0 |
| 3 | Signal Degradation (SD) | The switching is performed when the spare transmission line status is normal assuming the current transmission line B2 error rate degradation $10^{-8}$ to $10^{-9}$ as a trigger. | 1 | 0 | 1 | 0 |
| 4 | Wait to Restore (WR) | Even if a fault of the current transmission line is recovered during switching by the automatic switching function (SF or SD), the transmission line name is not changed during the protection time. | 0 | 1 | 1 | 0 |
| 5 | Reverse Request (RR) | The switching is performed when the equipment receives the forced switching (FS), automatic switching (SF or SD), or recovery standby (WR) request. | 0 | 0 | 1 | 0 |
| 6 | No Bridge Required (NB) | No switching request is outputted from the current transmission line. The switching is canceled. | 0 | 0 | 0 | 0 |

When CPU 11 receives the notification of fault occurrence, it writes the fault occurrence or fault information A, the timer setting B for setting the protection time necessary for the transmission line switching procedure, for example, 50 ms, and the mode setting C for inhibiting switching of the transmission line in the fault information memory 3 (shown in FIG. 2) of the switching control unit 8. Then, the switching control unit 8 executes the processing which is described later and transmits transmitting switching control data D to the spare transmission line interface unit 10 via the communication channel. Furthermore, when the switching control unit 8 receives receiving switching control data E from the opposite transmitter 30 via the communication channel and spare transmission line interface unit 10, the switching control unit 8 interrupts the control CPU 11 with an interruption signal F so as to inform CPU 11 of an occurrence of switching. When the control CPU 11 receives the notification of switching occurrence, CPU 11 reads the switching information (transition status data G) stored in the switching status storing unit 7 (shown in FIG. 2) of the switching control unit 8, sends the transmission line selection signal H (a signal indicating that one of the 0 and 1 systems is selected) included in the data to the current and spare transmission line interface units 9 and 10, and switches the transmission line from the current transmission line to the spare transmission line, namely to the interface unit 10 of the spare transmission line.

Figure 2:
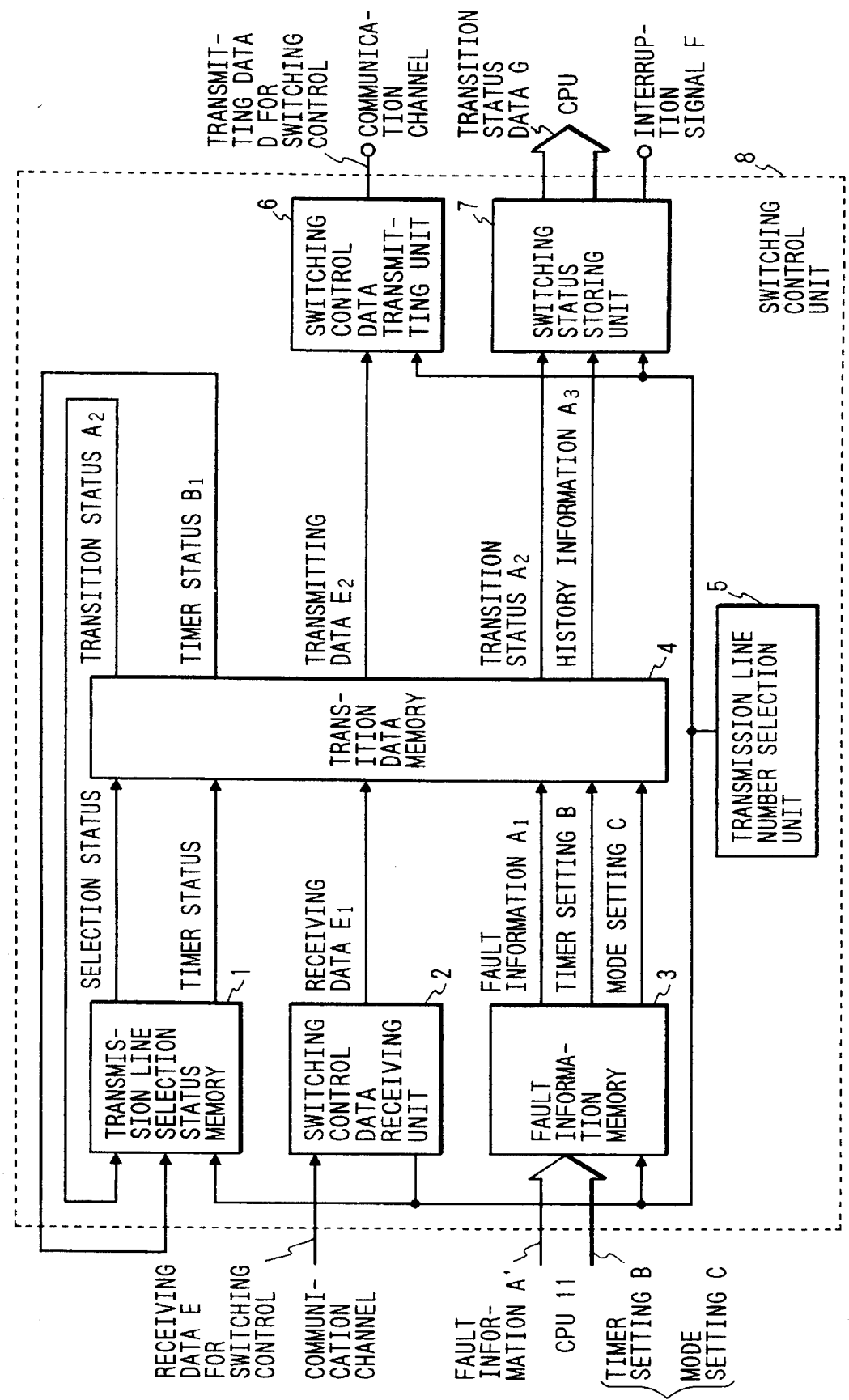
FIG. 2 is a basic schematic view of the transmission line switching control unit of the present invention.

FIG. 2 is a basic schematic view showing an embodiment of the switching control unit shown in FIG. 1. In FIG. 2, numeral 3 indicates a fault information memory which is connected to the control CPU 11 shown in FIG. 1 and stores fault information A' of the self transmitter 20 from the above CPU, timer setting information (timer value: 50 ms) B, and switching inhibition mode setting information C, 2 a switching data receiving unit for storing receiving switching control data E supplied from the opposite transmitter 30 via the communication channel, 1 a transmission line selection status memory for storing information (selection or transition information) A indicating the present transmission line selection status, that is, which one of the current and spare transmission lines (0 and 1 systems) is selected at present and timer status (timer count status) information B1, 4 a transition data memory for storing outputs (fault information A1, timer setting B, mode setting C, receiving switching control data E1, timer status B1, selection status A2) of the above fault information memory 3, the above switching control data receiving unit 2, and the above transmission line selection status memory 1, 6 a switching control data transmitting unit for storing output data (transmitting switching control data E2) of the memory 4 and transmitting the stored switching control data to the opposite transmitter 30 as transmitting switching control data D via the communication channel, 7 a switching status storing unit for storing output (transition status A2, history information A3) of the memory 4 and sending it to CPU 11 of the self transmitter 20 as switching information (transition status data G) and an interruption signal F, and 5 a transmission line number selection unit which is connected to the above memories, units, and CPU 11 and selects the processing transmission line number by an instruction of the above CPU 11. The timer value and mode are set from the outside of the switching control unit 8.

Next, the processing procedure of the switching control unit 8 will be described. Firstly, the data A2 indicating the present transmission line selection status (transition status) and the data B1 indicating the timer status are outputted from the transmission line selection status memory 1 for the processing transmission line number selected by the transmission line number selection unit 5 of the switching control unit 8 by an instruction of the control CPU 11 of the equipment 20, and the receiving switching control data E1 from the opposite transmitter 30 is outputted from the switching control data receiving unit 2, and the fault information A1 of the self transmitter, the timer set value (timer value) B, and the mode setting C are outputted from the fault information memory 3, and these are inputted into the transition data memory 4 as input addresses.

The transition data memory 4 outputs data such as the data A2 indicating the transmission line selection status (transition status), the data B1 indicating the timer status, the transmitting data (switching control data) E2 to be transmitted to the opposite transmitter 30, or the history information A3 according to each input indicated above. The selection status (transition status) and timer status output data A2 and B1 are stored in the transmission line selection status memory 1, and the transmitting data E2 is supplied to the switching control data transmitting unit 6, and the selection status (transition status) and history information data A2 and A3 are stored in the switching status storing unit 7. The data stored in the transmission line selection status memory 1 is used for the next transmission line switching control processing as a present transmission line selection status and a timer status. The transmitting switching control data E2 supplied to the switching control data transmitting unit 6 is transmitted to the opposite transmitter 30 via the communication channel so as to use as the next switching control data (comparison data of the switching status storing unit 7). Furthermore, the data A2 and A3 stored in the switching status storing unit 7 are compared with the previous selection status (data).

When any change or a discrepancy occurs in the above comparison result or the history information A3 is sent from the memory 4, an interruption signal F is sent to CPU 11 of the self transmitter 20 and supplied to CPU 11 as transition status data G simultaneously. CPU 11 executes the aforementioned transmission line switching control.

As mentioned above, by transmitting the switching control data to the opposite transmitter not through the CPU of the equipment and switching the self transmitter by sending the data to the CPU, the load of the CPU can be reduced and the switching process time can be shortened.

Furthermore, by setting the timer value, switching inhibition, or the number of processing transmission lines from the outside, for example, the CPU, various switching methods can be used.

In the above embodiment, the timer value of the switching control unit 8 may be set by CPU 11 of the self transmitter outside the above switching control unit. Furthermore, by setting by CPU 11 of the equipment outside the self transmitter, switching of only a specific transmission line may be stopped, or switching of the previous transmission line may be stopped, or furthermore the number of processing transmission lines may be changed.

Furthermore, according to the aforementioned embodiments, a switching signal to the opposite transmitter may be sent from the switching control unit not through the CPU of the self transmitter, and the processing load of the CPU may be reduced and the switching process time may be shortened because the CPU is notified only when the switching control processing is necessary. Furthermore, by setting the timer value, switching inhibition, or the number of processing transmission lines from the CPU of the transmitter, various switching methods can be used.

What is claimed is:

1. A transmission line switching control method in a transmission system having a plurality of transmitters each having a switching control unit including memory means and interface means connecting a plurality of transmission lines for communicating with at least another transmitter, comprising the steps of:

storing selection status data and switching control data in said memory means;

updating, when at least a switching of a current transmission line to a spare transmission line occurs, at least one of said selection status data indicating which of a plurality of kinds of switching of said transmission lines has been selected and said switching control data indicating which of a plurality of switching request types has been requested stored in said memory means;

transmitting a switching signal indicating a switching request type for communicating between said transmitter and said another transmitter communicating when a fault occurs in said transmitter;

receiving said switching signal in said another transmitter;

comparing, by the switching control unit in said another transmitter, the received switching signal with the updated selection status data and switching control data; and switching the current transmission line, by said switching control unit in said another transmitter, to a spare transmission line, when a discrepancy is detected in the comparing step.

2. A transmission line switching control method according to claim 1, further comprising the step of:

storing in said memory means, by said switching control unit in said another transmitter, timer information for setting a time value within which to perform the comparing step and the switching step.

3. A transmission line switching control method according to claim 1, wherein specific lines in said plurality of transmission lines are prohibited from having performed thereon said updating, transmitting, receiving, comparing and switching steps.

4. A transmission line switching control method according to claim 1, wherein a number indicative of transmission lines that can have performed thereon said updating, transmitting, receiving, comparing and switching steps can be changed by said switching control unit.

5. A transmission line switching control method according to claim 1, wherein said updating step further comprises the step of:

updating history information of said selection status data.

6. A transmission line switching control method according to claim 1, further comprising the steps of:

sending information of the detected discrepancy to said transmitter; and wherein the switching performed in the switching step is performed by said transmitter based upon the detected discrepancy.

7. A transmission line switching control apparatus in a transmission system having a plurality of transmitters each having a switching control unit including memory means and interface means connecting a plurality of transmission lines for communicating with at least another transmitter, comprising:

means for storing selection status data and switching control data in said memory means;

means for updating, when at least a switching of a current transmission line to a spare transmission line occurs, at least one of selection status data indicating which of a plurality of kinds of switching of said transmission lines has been selected and switching control data indicating which of a plurality of switching request types has been requested stored in said memory means;

means for transmitting a switching signal indicating a switching request type for communicating between said transmitter and said another transmitter communicating when a fault occurs in said transmitter;

means for receiving said switching signal in said another transmitter;

means for comparing, by the switching control unit in said another transmitter, the received switching signal with the updated selection status data and switching control data; and means for switching, by said switching control unit in said another transmitter, the current transmission line to a spare transmission line when a discrepancy is detected by said comparing means.

8. A transmission line switching control apparatus according to claim 7, further comprising:

means, included in said switching control unit in said another transmitter, for storing in said memory means timer information for setting a time value within which to perform the comparing and switching functions.

9. A transmission line switching control apparatus according to claim 7, further comprising:

means for prohibiting specific lines in said plurality of transmission lines from having performed thereon said updating, transmitting, receiving, comparing and switching operations.

10. A transmission line switching control apparatus according to claim 7, further comprising:

means for changing a number indicative of transmission lines that can have performed thereon said updating, transmitting, receiving, comparing and switching operations.

11. A transmission line switching control apparatus according to claim 7, wherein said means for updating further updates history information of said switching control data.

12. A transmission line switching control apparatus according to claim 7, further comprising:

means for sending information of the detected discrepancy to said transmitter;

wherein the switching performed by the switching means is performed by said transmitter based upon the detected discrepancy.

\* \* \* \* \*